(12) United States Patent
Rossi

(10) Patent No.: US 11,483,408 B2
(45) Date of Patent: Oct. 25, 2022

(54) FEATURE-BASED NETWORK EMBEDDING

(71) Applicant: Adobe Inc., San Jose, CA (US)

(72) Inventor: Ryan Rossi, Santa Clara, CA (US)

(73) Assignee: Adobe Inc., San Jose, CA (US)

( * ) Notice: Subject to any disclaimer, the term of this patent is extended or adjusted under 35 U.S.C. 154(b) by 36 days.

(21) Appl. No.: 16/507,204

(22) Filed: Jul. 10, 2019

(65) Prior Publication Data

US 2021/0014124 A1 Jan. 14, 2021

(51) Int. Cl.
*H04L 67/50* (2022.01)
*H04L 43/045* (2022.01)
*H04L 41/142* (2022.01)
*H04L 43/067* (2022.01)
*G06F 16/2458* (2019.01)
*G06F 16/901* (2019.01)
*H04L 41/14* (2022.01)
(Continued)

(52) U.S. Cl.
CPC ........ *H04L 67/535* (2022.05); *G06F 16/2477* (2019.01); *G06F 16/9024* (2019.01); *H04L 41/142* (2013.01); *H04L 43/045* (2013.01); *H04L 43/067* (2013.01); *G06F 16/285* (2019.01); *H04L 41/082* (2013.01); *H04L 41/145* (2013.01); *H04L 67/306* (2013.01)

(58) Field of Classification Search
CPC ............. G06F 16/9024; G06F 16/9535; G06F 16/2477; G06F 16/285; H04L 41/142; H04L 41/145; H04L 41/069; H04L 43/062; H04L 43/067; H04L 67/22; H04L 67/535; H04L 43/045
See application file for complete search history.

(56) References Cited

U.S. PATENT DOCUMENTS 8,290,975 B2   10/2012   Gao et al.
8,566,030 B1   10/2013   Demiryurek et al.
(Continued)

OTHER PUBLICATIONS

Ahmed et al., Learning Role-Based Graph Embeddings, In StarAI @ International Joint Conference on Artificial Intelligence, Jul. 2, 2018. pp. 1-8. (Year: 2018).*

(Continued)

*Primary Examiner* — Gregory Todd
(74) *Attorney, Agent, or Firm* — Kilpatrick Townsend & Stockton LLP

(57) ABSTRACT

In some embodiments, a network analysis system receives network data in the form of a temporal graph that includes nodes and edges. Each node represents an entity involved in a network. An edge connects two nodes to indicate an association between the two nodes. Each edge also has a temporal value indicating a time point when the association between the two nodes was created. The network analysis system generates a sequence of nodes by traversing the nodes in the temporal graph along edges with non-decreasing temporal values or with non-increasing temporal values. The network analysis system further replaces the identifiers of the nodes in the sequence to generate a sequence of feature values. Based on the sequence of feature values, the network analysis system determines network embeddings for the nodes in the temporal graph. Using the network embeddings, the network analysis system identifies two or more of the nodes in the temporal graph that belong to the same entity.

19 Claims, 5 Drawing Sheets

| | TEMPORAL WALKS 502 | FEATURE-BASED TEMPORAL WALKS 130 |
|---|---|---|
| 1 | H → (13) → I → (16) → K | $\Gamma_H \to \Gamma_I \to \Gamma_K$ |
| 2 | H → (24) → K | $\Gamma_H \to \Gamma_K$ |
| 3 | H → (5) → Q → (10) → F | $\Gamma_H \to \Gamma_Q \to \Gamma_F$ |
| 4 | B → (3) → D → (9) → F | $\Gamma_B \to \Gamma_D \to \Gamma_F$ |
| 5 | B → (3) → D → (4) → C → (7) → D | $\Gamma_B \to \Gamma_D \to \Gamma_C \to \Gamma_D$ |
| 6 | B → (3) → D → (11) → P | $\Gamma_B \to \Gamma_D \to \Gamma_P$ |

(51) Int. Cl.
    *H04L 67/306*    (2022.01)
    *H04L 41/082*    (2022.01)
    *G06F 16/28*     (2019.01)

(56) References Cited

U.S. PATENT DOCUMENTS

| | | | |
|---|---|---|---|
| 9,064,002 B1* | 6/2015 | Gyongyi | G06Q 10/10 |
| 9,697,260 B2 | 7/2017 | Hale et al. | |
| 10,019,190 B2 | 7/2018 | Rao et al. | |
| 10,127,115 B2 | 11/2018 | Kandylas et al. | |
| 10,331,753 B1 | 6/2019 | Zhang et al. | |
| 11,263,265 B1* | 3/2022 | Austern | G06F 16/2365 |
| 2011/0078189 A1 | 3/2011 | Bonchi et al. | |
| 2012/0324027 A1* | 12/2012 | Vaynblat | H04L 51/32 709/206 |
| 2013/0268565 A1 | 10/2013 | Stergiu | |
| 2014/0066044 A1* | 3/2014 | Ramnani | H04W 8/24 455/418 |
| 2014/0164511 A1 | 6/2014 | Williams et al. | |
| 2015/0074044 A1 | 3/2015 | Metreveli et al. | |
| 2015/0081725 A1 | 3/2015 | Ogawa et al. | |
| 2015/0161229 A1* | 6/2015 | Davies | G06F 16/9024 707/737 |
| 2016/0239660 A1* | 8/2016 | Azvine | G06F 21/55 |
| 2016/0299991 A1* | 10/2016 | Hong | G06F 16/2246 |
| 2017/0257291 A1 | 9/2017 | Zhao et al. | |
| 2017/0351406 A1 | 12/2017 | Rossi et al. | |
| 2017/0357905 A1 | 12/2017 | Rossi et al. | |
| 2017/0365071 A1 | 12/2017 | Rossi et al. | |
| 2018/0040011 A1* | 2/2018 | Milton | H04W 4/021 |
| 2018/0082197 A1* | 3/2018 | Aravamudan | G06N 5/04 |
| 2018/0262883 A1* | 9/2018 | Li | G06F 40/30 |
| 2018/0367414 A1 | 12/2018 | Raghavendra et al. | |
| 2019/0104023 A1* | 4/2019 | Rimar | H04L 41/145 |
| 2019/0155961 A1* | 5/2019 | Alonso | G06F 16/284 |
| 2019/0286752 A1 | 9/2019 | Leskovec et al. | |
| 2020/0110623 A1* | 4/2020 | Vangala | G06F 9/453 |
| 2020/0177616 A1* | 6/2020 | Hadar | H04L 63/1433 |
| 2020/0220892 A1* | 7/2020 | Gibson | G06F 16/9024 |
| 2020/0301972 A1* | 9/2020 | Wang | G06F 21/316 |

OTHER PUBLICATIONS

Aggarwal, "Evolutionary Network Analysis: A Survey", Jul. 1, 2014, 36 pages.
Aggarwal, "On Dense Pattern Mining in Graph Streams", Sep. 1, 2010, 10 pages.
Aggarwal, "Outlier Detection in Graph Streams", Apr. 11, 2011, 11 pages.
Ahmed, "Distributed Large-scale Natural Graph Factorization", Dec. 13, 2013, 11 pages.
Ahmed, "Inductive Representation Learning in Large Attributed Graphs", Nov. 22, 2017, 3 pages.
Ahmed, "Interactive Visual Graph Analytics on the Web", Apr. 21, 2015, 4 pages.
Ahmed, "On Sampling from Massive Graph Streams", Mar. 7, 2017, 13 pages.
Albert, "The Diameter of the world wide web", Sep. 10, 1999, 5 pages.
Belkin, "Laplacian Eigenmaps for Dimensionality Reduction and Data Representation", Neural Computation 15 (2002), Dec. 8, 2002, 28 pages.
Bogers, "Movie Recommendation using Random Walks over the Contextual Graph", Jan. 2010, 5 pages.
Bonchi, "Learning influence probabilities in social networks", In Proceedings of the third ACM international conference on Web search and data mining, Feb. 2010, 10 pages.
Broder, "Graph Structure in the Web", Computer Networks 33, 1-6 (2000), Jun. 2000, 12 pages.
Cai, "Facilitating Real-Time Graph Mining", In Proceedings of the Fourth International Workshop on Cloud Data Management. 8, Oct. 29, 2012, 8 pages.

Camacho, "Robust Patterns in Food Web Structure", May 14, 2002, 5 pages.
Cavallari, "Learning Community Embedding with Community Detection and Node Embedding on Graphs", Nov. 2017, pp. 377-386.
Cazabet, "Dynamic Community Detection", Sep. 1, 2014, 14 pages.
Chung, "Random walks and local cuts in graphs", May 1, 2007, 13 pages.
Coa, "GraRep: Learning Graph Representations with Global Structural Information", Oct. 23, 2015, 10 pages.
Dong, "metapath2vec: Scalable Representation Learning for Heterogeneous Networks", Aug. 13, 2017, pp. 135-144.
Dunlavy, "Temporal Link Prediction using Matrix and Tensor Factorizations", Jun. 19, 2010, 29 pages.
Dunne, "Food-web structure and network theory: The role of connectance and size", Oct. 1, 2002, pp. 12917-12922.
Faloutsos, "On Power-Law Relationships of the Internet Topology", Oct. 1999, 12 pages.
Fu, "Dynamic Mixed Membership Blockmodel for Evolving Networks", Jun. 14, 2009, 8 pages.
Gleich, "A Dynamical System for PageRank with Time-Dependent Teleportation", Nov. 18, 2012, 30 pages.
Grady, "Random Walks for Image Segmentation", IEEE Transactions on Pattern Analysis and Machine Intelligence, vol. 28, No. 11, Nov. 2006, 17 pages.
Grover, "node2vec: Scalable Feature Learning for Networks", Jul. 3, 2016, 10 pages.
Guha, "Graph Synopses, Sketches, and Streams: A Survey", Aug. 27, 2012, pp. 2030-2031.
Hisano, "Semi-supervised Graph Embedding Approach to Dynamic Link Prediction", Oct. 14, 2016, 15 pages.
Holme, "Temporal Networks", Dec. 16, 2011, 28 pages.
Java, "Modeling the Spread of Influence on the Blogosphere", Mar. 14, 2006, 7 pages.
Jeong, "Lethality and Centrality in Protein Networks", Jun. 2001, 5 pages.
Jeong, "The large-scale organization of metabolic networks", Oct. 5, 2000, pp. 651-654.
Kamra, "Deep Generative Dual Memory Network for Continual Learning", May 25, 2018, 15 pages.
Kleczkowski, "Mean-field-type equations for spread of epidemics: the 'small world' model", Dec. 1999, pp. 355-360.
Krebs, "Mapping Networks of Terrorists Cells", Mar. 2002, pp. 43-52.
Lassez, "Ranking Links on the Web: Search and Surf Engines", Jun. 2008, 10 pages.
Latapy, "Computing communities in large networks using random walks", Dec. 14, 2004, 15 pages.
Lee, "Deep Graph Attention Model", Sep. 15, 2017, 9 pages.
Liao, "Attributed Social Network Embedding", May 14, 2017, 12 pages.
Liu, "Link Prediction Based on Local Random Walk", Jan. 14, 2010, 6 pages.
Lovasz, "Random Walks on Graphs: A Survey", Jan. 1993, 46 pages.
Maslov, "Specificity and stability in topology of protein networks", May 17, 2002, 17 pages.
May, "Infection dynamics on scale-free networks", Nov. 19, 2001, 4 pages.
McGovern, "Exploiting Relational Structure to Understand Publication Patterns in High Energy Physics", Dec. 2003, pp. 165-172.
Mikolov, "Efficient estimation of word representations in vector space", arXiv preprint arXiv:1301.3781 (2013), Sep. 7, 2013, 12 pages.
Moore, "Epidemics and percolation in small-world networks", Jan. 7, 2000, 6 pages.
Neville, "Using Relational Knowledge Discovery to Prevent Securities Fraud", Aug. 21, 2005, 10 pages.
Newman, "The structure of scientific collaboration networks", Jan. 16, 2001, pp. 404-409.
Ng, "On Spectral Clustering: Analysis and an Algorithm", 8 pages.
O'Madadhain, "Prediction and Ranking Algorithms for Event Based Network Data", Dec. 2005, pp. 23-30.

(56) References Cited

OTHER PUBLICATIONS

Page, "The PageRank Citation Ranking: Bringing Order to the Web", Jan. 29, 1998, 17 pages.
Pastor-Satorras, "Epidemic spreading in scale-free networks", Feb. 1, 2008, 13 pages.
Perozzi, "DeepWalk: Online Learning of Social Representations", Jun. 27, 2014, 10 pages.
Pienta, "Scalable Graph Exploration and Visualization: Sensemaking Challenges and Opportunities", Mar. 2015, pp. 271-278.
Ranshous, "Anomaly detection in dynamic networks: a survey", Jun. 2015, pp. 223-247.
Ribiro, "struc2vec: Learning Node Representations from Structural Identity", Jul. 3, 2017, 10 pages.
Rossi, "Deep Feature Learning for Graphs", Oct. 16, 2017, 11 pages.
Rossi, "Modeling Dynamic Behavior in Large Evolving Graphs", Feb. 4, 2013, 11 pages.
Rossi, "Modeling the Evolution of Discussion Topics and Communication to Improve Relational Classification", Jul. 25, 2010, 9 pages.
Rossi, "Time-Evolving Relational Classification and Ensemble Methods", Jun. 2, 2012, 12 pages.
Servetto, "Constrained Random Walks on Random Graphs: Routing Algorithms for Large Scale Wireless Sensor Networks", Sep. 28, 2002, 10 pages.
Soundarajan, "Generating Graph Snapshots from Streaming Edge Data", Apr. 11, 2016, 2 pages.
Sun, "GraphScope: Parameter-free Mining of Large Time-evolving Graphs", Aug. 12-15, 2007, 10 pages.
Tang, "LINE: Large-scale Information Network Embedding", Mar. 12, 2015, 11 pages.
Wagner, "The small world inside large metabolic networks", Jan. 24, 2001, pp. 1803-1810.
Watts, "Collective dynamics of 'small-world' networks", Jun. 4, 1998, 3 pages.
First Action Interview Pilot Program Pre-Interview Communication from related U.S. Appl. No. 16/192,313, dated Feb. 6, 2020, 7 pages.
Notice of Allowance from related U.S. Appl. No. 16/192,313, dated May 19, 2020, 33 pages.
Nguyen et al., "Continuous-Time Dynamic Network Embeddings", Apr. 23-27, 2018 (Year, 2018), 8 pages.
Aghazadeh et al., RHash: Robust Hashing Via l-norm Distortion, Proceedings of the Twenty-Sixth International Joint Conference on Artificial Intelligence, Aug. 4, 2017, pp. 1386-1394.
Ahmed et al., Learning Role-Based Graph Embeddings, In StarAI @ International Joint Conference on Artificial Intelligence, Jul. 2, 2018, pp. 1-8.
Bhattacharya et al., Collective Entity Resolution in Relational Data, TKDD, vol. 1, Issue 1, Mar. 2007, 35 pages.
Broder et al., Syntactic clustering of the Web, Computer Networks and ISDN Systems, vol. 29, No. 8, Jul. 25, 1997, 13 pages.
Cao et al., Deep Neural Networks for Learning Graph Representations, Proceedings of the Thirtieth AAAI Conference on Artificial Intelligence, Feb. 12-17, 2016, pp. 1145-1152.
Charikar, Similarity Estimation Techniques from Rounding Algorithms, Proceedings of the Thirty-Fourth Annual ACM Symposium on Theory of Computing, May 19-21, 2002, pp. 380-388.
Christen,Peter, Concepts and Techniques for Record Linkage, Entity Resolution, and Duplicate Detection, Springer, 2012, 5 pages.
Cohen et al., Learning to Match and Cluster Large High-Dimensional Data Sets for Data Integration, Proceedings of the Eighth ACM SIGKDD International Conference on Knowledge Discovery and Data Mining, Jul. 23-26, 2002, pp. 475-480.
Dasgupta et al., Overcoming Browser Cookie Churn with Clustering, Proceedings of the Fifth ACM international Conference on Web Search and Data Mining, Feb. 8-12, 2012, pp. 83-92.
Datar et al., Locality-Sensitive Hashing Scheme Based on p-Stable Distributions, Proceedings of the Twentieth Annual Symposium on Computational Geometry, Jun. 8-11, 2004, pp. 253-262.
Dong et al., Data Fusion-Resolving Data Conflicts for Integration, VLDB, vol. 2, No. 2, 2009, pp. 1654-1655.
Dong et al., metapath2vec: Scalable Representation Learning for Heterogeneous Networks, Proceedings of the 23rd ACM SIGKDD International Conference on Knowledge Discovery and Data Mining, Aug. 13-17, 2017, pp. 135-144.
Erinaki et al., Web Mining for Web Personalization, ACM Trans., Internet Technol, vol. 3, No. 1, Feb. 2003, 27 pages.
Getoor et al., Entity Resolution for Big Data, Proceedings of the 19th ACM SIGKDD international conference on Knowledge discovery and data mining, Aug. 11-14, 2013, p. 1526.
Grover et al., node2vec: Scalable Feature Learning for Networks, In Proceedings of the 22nd ACM SIGKDD International Conference on Knowledge Discovery and Data Mining, Aug. 2016, pp. 855-864.
Hamilton et al., Inductive Representation Learning on Large Graphs, 31st Conference on Neural Information Processing Systems, Jun. 2017, pp. 1024-1034.
Heimann et al., REGAL: Representation Learning-based Graph Alignment, Proceedings of the 27th ACM International Conference on Information and Knowledge Management, Oct. 22-26, 2018, pp. 117-126.
Indyk et al., Approximate Nearest Neighbors: Towards Removing the Curse of Dimensionality, Proceedings of the thirtieth annual ACM symposium on Theory of computing, 1998, pp. 604-613.
Ji et al., Min-Max Hash for Jaccard Similarity, IEEE 13th International Conference on Data Mining, 2013, 1 page.
Kang et al., Robust and Efficient Locality Sensitive Hashing for Nearest Neighbor Search in Large Data Sets, NIPS BigLearn Workshop, 2012, 8 pages.
Kim et al., Probabilistic Visitor Stitching on Cross-Device Web Logs, Proceedings of the 26th International Conference on World Wide Web, Apr. 3-7, 2017, pp. 1581-1589.
Kolb et al., Efficient Deduplication with Hadoop, VLDB, vol. 5, No. 12, Aug. 2012, pp. 1878-1881.
Li et al., One Permutation Hashing, Proceedings of the 25th International Conference on Neural Information Processing Systems, vol. 2, Dec. 3-6, 2012, pp. 3113-3121.
Li et al., Theory and Applications of b-Bit Minwise Hashing, Comm. of the ACM, vol. 54, No. 8, Aug. 2011, 9 pages.
Li et al., Very Sparse Random Projections, Proceedings of the 12th ACM SIGKDD International Conference on Knowledge Discovery and Data Mining, Aug. 20-23, 2006, pp. 287-296.
Lv et al., Multi-Probe LSH: Efficient Indexing for High-Dimensional Similarity Search, Proceedings of the 33rd International Conference on Very Large Data Bases, Sep. 23-27, 2007, 12 pages.
Nguyen et al., Continuous-Time Dynamic Network Embeddings, Companion Proceedings of the The Web Conference 2018, Apr. 23-27, 2018, pp. 969-976.
Papadakis et al., Comparative Analysis of Approximate Blocking Techniques for Entity Resolution, Proceedings of the VLDB Endowment, vol. 9, Issue 9, May 2016, pp. 684-695.
Perozzi et al., DeepWalk: Online Learning of Social Representations, Proceedings of the 20th ACM SIGKDD International Conference on Knowledge Discovery and Data Mining, Aug. 24-27, 2014, pp. 701-710.
Qiu et al., Network Embedding as Matrix Factorization: Unifying DeepWalk, LINE, PTE, and node2vec, WSDM, 2018, 9 pages.
Ribeiro et al., struc2vec: Learning Node Representations from Structural Identity, KDD '17, Research Track, Aug. 13-17, 2017, pp. 385-394.
Ricci et al., Recommender Systems Handbook, Springer, 2011, 845 pages.
Rossi et al., Deep Inductive Network Representation Learning, Companion Proceedings of the The Web Conference 2018, Apr. 23-27, 2018, pp. 953-960.
Rossi et al., Role Discovery in Networks, IEEE Transactions on Knowledge & Data Engineering (TKDE), vol. 27, No. 4, 2015, pp. 1112-1131.
Rossi et al., The Network Data Repository with Interactive Graph Analytics and Visualization, Proceedings of the Twenty-Ninth AAAI

(56) References Cited

OTHER PUBLICATIONS

Conference on Artificial Intelligence, Available Online at: http://networkrepository.com, 2015, pp. 4292-4293.

Roy et al., Probabilistic Deduplication of Anonymous Web Traffic, Companion Proceedings of the 24th International Conference on World Wide Web, May 18-22, 2015, pp. 103-104.

Shi et al., Aspem: Embedding Learning by Aspects in Heterogeneous Information Networks, In Proceedings of the 2018 SIAM International Conference on Data Mining, 2018, 7 pages.

Shrivastava et al., Densifying One Permutation Hashing via Rotation for Fast Near Neighbor Search, Proceedings of the 31st International Conference on International Conference on Machine Learning, vol. 32, Jun. 21-26, 2014, 9 pages.

Tang et al., Leveraging Social Media Networks for Classification, Data Mining and Knowledge Discovery, vol. 23, No. 3, Nov. 3, 2011, pp. 447-478.

Tang et al. LINE: Large-scale Information Network Embedding, Proceedings of the 24th International Conference on World Wide Web, May 18-22, 2015, pp. 1067-1077.

Wang et al., Hashing for Similarity Search: A Survey, Aug. 14, 2014, 29 pages.

Wang et al., Structural Deep Network Embedding, Proceedings of the 22nd ACM SIGKDD International Conference on Knowledge Discovery and Data Mining, Aug. 13-17, 2016, 10 pages.

Weiss et al., Spectral Hashing, Proceedings of the 21st International Conference on Neural Information Processing Systems, Dec. 8-10, 2008, 8 pages.

Zhang et al., Multiple Anonymized Social Networks Alignment, IEEE International Conference on Data Mining, 2015, 10 pages.

\* cited by examiner

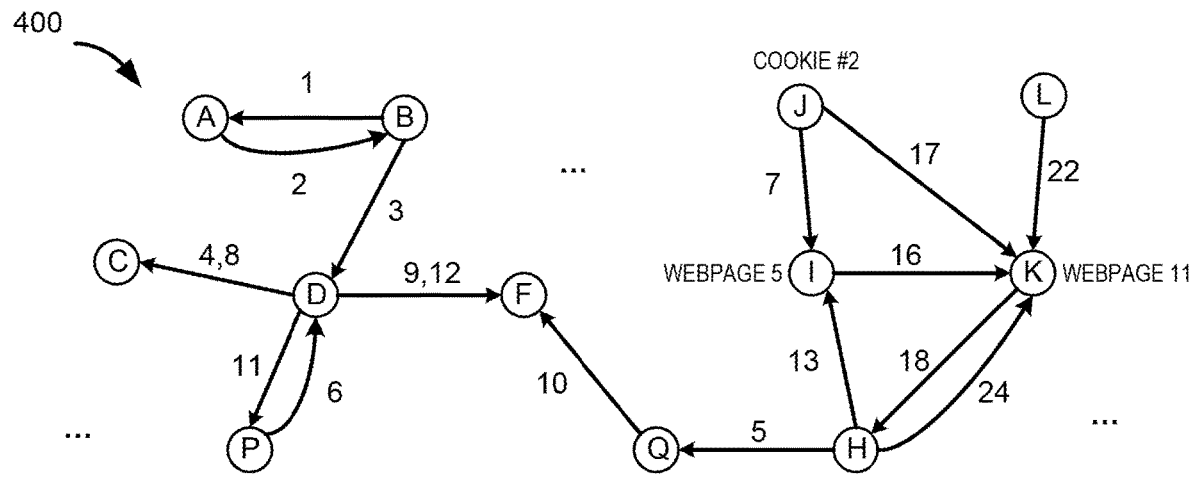

FEATURE-BASED NETWORK EMBEDDING

TECHNICAL FIELD

This disclosure relates generally to determining network embeddings that describe the underlying characteristics of nodes in a network. More specifically, but not by way of limitation, this disclosure relates to creating network embeddings (e.g., vectors or other encoded representations) that describe relationships among entities in a network based on analyzing structural features and temporal relationships with respect to nodes in a temporal graph, which represents the network entities and their interactions.

BACKGROUND

Graphs can be utilized to represent different types of networks, such as Internet-related networks, science and research collaboration networks, communication networks between members and groups in social networks, and so on. In a graph, entities in the network are represented as nodes, and interactions between two entities are modeled in the graph as an edge connecting the corresponding nodes. These networks are typically dynamic, in that the entities and the interactions between the entities in the network evolve over time. For instance, in an Internet-related network, computers (one type of entity) may join or leave the network from time to time and webpages (another type of entity) may be added or deleted from a web server that is accessible through the network. A computer may be visiting one webpage at a certain time while visiting another webpage at a different time. A computer and webpages are represented as nodes in a network, and the computer visiting these webpages in the network is represented using edges between the nodes. The temporal graph can have structural features indicating the nature of these network interactions. For instance, an edge having a direction pointing from the computer node to the webpage node indicates that the computer node has visited the webpage. In this example, the edge is referred to an "outgoing" edge of the computer node and an "incoming" edge of the webpage node.

Analyzing such a graph that represents a network can help to identify underlying structure, property or characteristic of the network. To do so, network embeddings are determined for the nodes in the graph. An example of a network embedding of a node is a vector representation of the node, where the elements of the vector represent an encoded description of the underlying characteristics of the node. The network embeddings of the nodes can be utilized in various applications. For instance, in an Internet-related network, the network embeddings of nodes may be utilized to determine that various sessions or cookies belong to the same user (e.g., because the points defined by the network embeddings are clustered together in a network embedding space). This determination that multiple sessions or cookies belong to the same user can be used to establish a user profile for the user. Such a user profile could be used to, for example, generate recommended or personalized content for delivery to a computing device associated with the user.

Existing approaches for determining network embeddings from graph-based representations of network present disadvantages. For instance, these existing approaches often ignore the feature values associated with nodes in the graph when generating network embeddings from the graph. In one example, a network embedding is generated by selecting and examining a sequence of nodes connected through edges. In this example analysis, the nodes are represented using the identification (ID) of each node, such as a serial number assigned to the node when the node is added to the graph. These IDs merely label the nodes in the graph and do not describe or otherwise characterize the nodes. The analysis of these nodes only relies on these node IDs, rather than other features of the nodes, to determine network embeddings. For instance, features of the nodes, such as the indegree (the number of incoming edges) on a node or outdegree (the number of outgoing edges) on the node, are ignored in the analysis. The features of the nodes often reflect the underlying characteristics of the node. For example, a node (modeling a device) having a high outdegree (e.g. the device has visited many webpages) is more likely to belong to the same user as the other node having a high outdegree than a node with a low outdegree. Ignoring the features of the nodes reduces the accuracy of the network embedding.

Because these existing approaches do not utilize all the information available in the graph, the approaches generate inaccurate network embeddings. These inaccurate network embeddings lead to additional problems in applications that rely on the embeddings. For instance, if the network embeddings used to link multiple sessions or cookies to a common user are inaccurate, the profile generated from this linking may be inaccurate or incomplete, thereby preventing effective customization of online content on a user device associated with the user profile.

SUMMARY

Certain embodiments involve determining network embeddings based on a sequence of feature values of nodes in the network. In one example, a network analysis system receives network data in the form of a temporal graph that includes nodes and edges. Each edge connects two nodes to indicate an association between the two nodes and has a temporal value indicating a time point when the two nodes were associated. The network analysis system traverses a subset of the nodes in the temporal graph along edges with non-decreasing temporal values to generate a sequence of nodes. The network analysis system further replaces identifications of the subset of nodes in the sequence of nodes with feature values of the respective nodes to form a sequence of feature values. The network analysis system generates network embeddings for each of the nodes in the sequence of nodes based on the sequence of feature values. The network analysis system further determines two or more of the nodes belong to the same entity based on the network embeddings of the nodes.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

FIG. 3 depicts an example of activity data associated with an online platform, according to certain aspects of the present disclosure.

FIG. 4 depicts an example of a portion of a temporal graph generated based on the example of activity data associated with the online platform shown in FIG. 3, according to certain aspects of the present disclosure.

FIG. 5 depicts an example of feature-based temporal walks generated from the example of the temporal graph shown in FIG. 4, according to certain aspects of the present disclosure.

DETAILED DESCRIPTION

Figure 1:
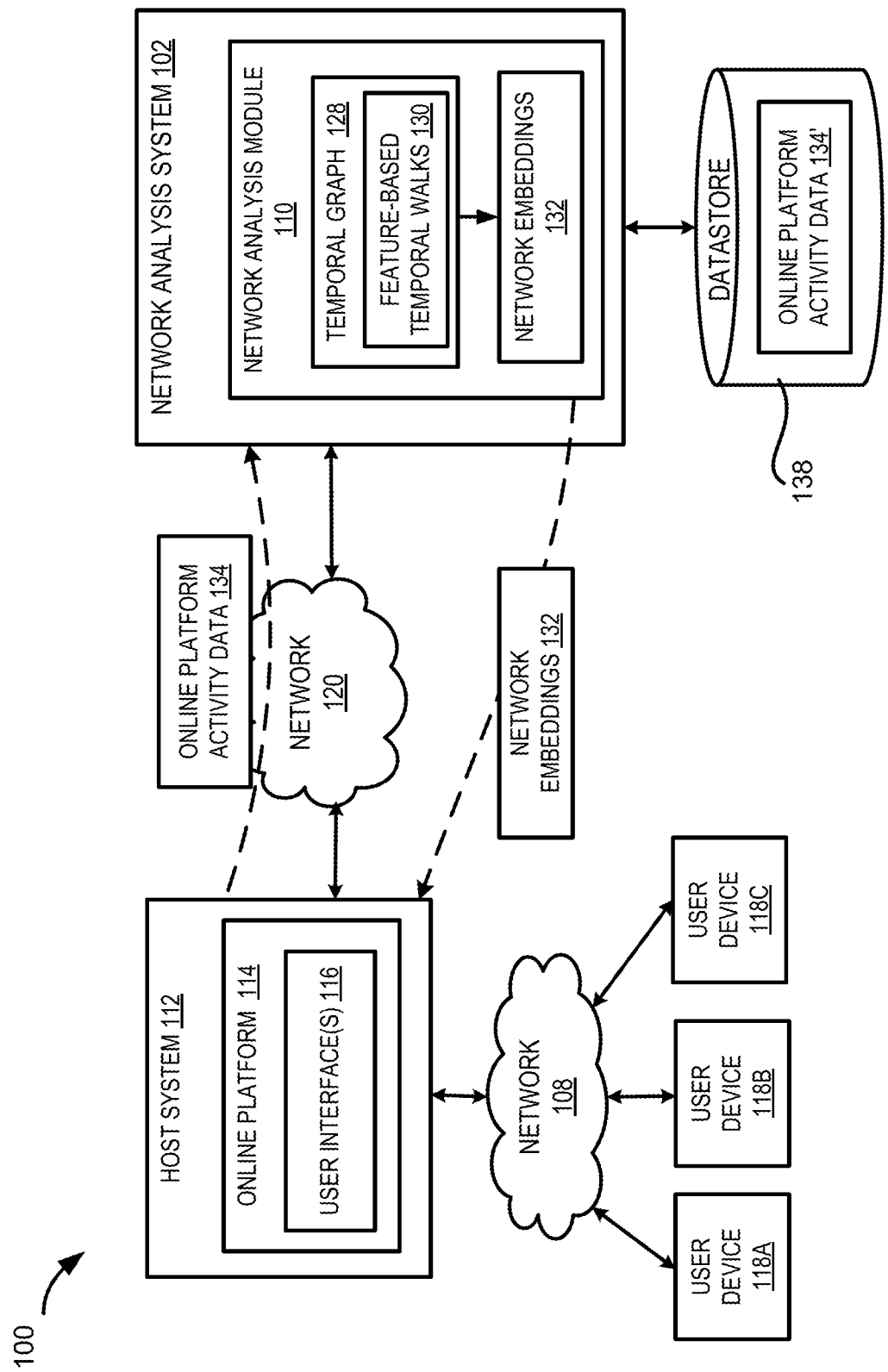
FIG. 1 depicts an example of a computing environment in which a network analysis system can be used to analyze the activities associated with an online platform and facilitate modifications to the online platform, according to certain aspects of the present disclosure.

Certain embodiments involve determining network embeddings based on a sequence of feature values of nodes in a temporal graph that represents a network. For instance, a network analysis system receives a temporal graph, which includes nodes and edges representing entities and their interactions. The network analysis system identifies, from the temporal graph, a sequence of nodes connected by edges with increasing temporal values. A temporal value of an edge indicates a time at which two nodes connected by the edge were associated with each other (e.g., a time at which interaction occurred). The network analysis system further replaces identifiers of nodes in the sequence with their respective feature values to form a sequence of feature values. The feature value of a node can include structural feature values such as the indegree (the number of incoming edges) or outdegree (the number of outgoing edges) of the node. The network analysis system generates, from the feature values, network embeddings for nodes in the sequence of nodes. Each network embedding is a feature vector representing underlying characteristics of the node. These network embeddings can be used, for example, to determine that different entities represented in the temporal graph all correspond to the same user (e.g., different user names on different websites belonging to the same user).

The following non-limiting example is provided to introduce certain embodiments. In this example, a network analysis system is included and is configured to determine network embeddings of nodes in a network. The network embeddings of the nodes can be used in many applications. For example, the network embeddings can be used for modeling user behavior, entity resolution, predictive modeling, and other graph-based machine learning tasks that depend on an appropriate representation of a network. To determine the network embeddings, the network analysis system receives network data in the form of a temporal graph having nodes and edges. For instance, in a temporal graph representing an Internet-related network, a node represents an entity involved in the network, such as a device that interacted with an online platform, a network address observed from the online platform, a webpage hosted by the online platform, and so on. An edge in such a temporal graph connects two nodes and represents an association between the corresponding two objects associated with the online platform. For example, an edge between nodes for a device and a webpage represents these entities being associated because the device visits the webpage, and an edge between nodes for a device and an IP address represents these entities being associated because the device has the IP address. Each edge also has a temporal value indicating the time when the two objects are associated (e.g., the time at which a device visited a webpage, the time at which a device was assigned an IP address, etc.).

Continuing this example, the network analysis system traverses the nodes in the temporal graph along edges to identify a sequence of nodes. The sequence of nodes complies with a time constraint, i.e., the sequence of edges connecting the sequence of nodes have temporal values in non-decreasing order. For instance, this sequence of nodes can be obtained by traversing nodes in the temporal graph along edges with non-decreasing temporal values (in temporal order) or with non-increasing temporal values (in reverse temporal order). By complying with the time constraint, the generated sequence of nodes captures the temporal aspect of the interactions modeled by the temporal graph.

Furthermore, the network analysis system modifies the identified sequence of nodes by replacing each identifier of a sequence nodes with a feature value of that node. A feature value represents, in an encoded form, one or more features of the temporal graph with respect to a node. For example, each node of the temporal graph can include structural features derived from the temporal graph's structure, such as the indegree of one or more nodes, outdegree of one or more nodes, or total degree of one or more nodes. One or more of these structural features can be represented by the feature value that replaces the node's identifier. In this manner, a sequence of feature values (i.e., the sequence of nodes with corresponding feature values) is generated. By generating this sequence of feature values, the network analysis system has a representation of both the structural features (e.g., indegree or outdegree), as represented via the feature values, and the temporal relationships associated with these features, as represented by the ordering of the sequence. The network analysis system can repeat the above process for other feature values of the nodes to generate multiple sequences of feature values.

In this example, the network analysis system uses the sequences of feature values to generate one or more network embeddings for the identified sequence of nodes. For instance, a sequence of feature values can be used as input to any embedding method such as the SkipGram model, or any other embedding method that generate embeddings based on sequences of data. Such an embedding method can generate a more accurate network embedding by using graph features represented by the sequence of feature values described above.

The determined network embeddings can be used in many applications. For example, the network embeddings can be analyzed to identify multiple nodes that belong to the same user or entity across multiple network sessions. As a result, content to be presented to a user can be personalized to the identified user. The network embeddings can also be utilized to build profiles for users. Based on the profiles of users, an online platform can deliver targeted content that is more relevant to a user, or a group of similar users.

As discussed above, because the technologies of determining network embeddings presented herein take into account the node features, the generated network embeddings more accurately capture the underlying characteristics of the nodes than existing approaches that ignored the node features. As a result, nodes that belong to the same entity can be more accurately identified. Personalized content generated for users or recommendation made to users thus more accurately match the preferences of the respective users.

As used herein, the term "temporal graph" is used to refer to a directed graph built for a network. The temporal graph can be built for homogeneous, bipartite, kpartite, and more generally heterogeneous graph data. As such, the temporal graph may also be referred to as a temporal network or relational data, a heterogeneous network or relational data, a homogeneous network or relational data, and so on depending on the underlying graph data. In this disclosure, graphs, relational data, and networks can be used interchangeably. The temporal graph includes a set of nodes connected through edges. A node of the temporal graph represents an object associated with the online platform, such as an entity interacted with the online platform, a network address observed from the online platform, a webpage hosted by the online platform, and so on. An edge of the temporal graph connects to two nodes and represents an association between the corresponding two objects associated with the online platform. Each edge also has a temporal value indicating the time when the two objects connected to the edge are associated. In one example, the temporal graph G can be defined as $G=(V, E_{96}, \tau)$ that includes a nodeset V and edgeset $E_\tau$. A node $v_i$ in the nodeset V has a d-dimensional feature vector $\Gamma_{v_i} = [f_{v_i,1}, f_{v_i,2}, \ldots, f_{v_i,d}]$, wherein $f_{v_i,j}$ is the j-th feature of node $v_i$ and d is the dimension of the feature vector. An edge $e_i = (v_i, v_{i+1})$ in the edgeset $E_\tau$ connecting two nodes in the nodeset V and has a temporal value $\tau(e_i)$ to indicate the time when the edge $e_i$ is added to the temporal graph G, i.e. when the two nodes connected to the edge $e_i$ are associated with each other.

As used herein, the term "temporal walk" on a graph is used to refer to a sequence of nodes where each pair of successive nodes are connected by an edge and the edges have non-decreasing temporal values. In one example, the temporal walk can be defined as: A temporal walk W of length L from $v_1$ to $v_L$ in graph $G=(V, E_{96}, \tau)$ is a sequence of vertices $(v_1, v_2, \ldots, v_L)$ such that $(v_i, v_{i+1}) \in E_\tau$, for $1 \leq i \leq L$, and the temporal values of the edges are in valid temporal order: $\tau(v_i, v_{i+1}) \leq \tau(v_{i+1}, v_{i+2})$ for $1 \leq i \leq L$. A temporal walk is also referred to herein as a "valid temporal walk."

As used herein, the term "feature-based temporal walk" on a graph is used to refer to a sequence of feature values or feature vectors whose corresponding nodes are connected by edges have non-decreasing temporal values. In one example, a feature-based temporal walk can be defined as: a feature-based temporal walk of length L from node $v_1$ to $v_L$ in graph $G=(V, E_\tau, \tau)$ is a sequence of feature values corresponding to the sequence of nodes in a valid temporal walk W. For the jth feature $f_{(j)}$, the corresponding feature-based temporal walk is $\langle w_{L,f_{(j)}} \rangle_{L \in N} = \langle f_{v_1,j}, f_{v_2,j}, \ldots, f_{v_L,j} \rangle$, where $f_{v_i,j}$ is the value of the j-th feature for node vi from the feature vector $\Gamma_{v_i}$. Alternatively, or additionally, a feature-based temporal walk can be generated for a temporal walk by replacing the node IDs with the d-dimensional feature vector $\Gamma$ of each node. In this case, the feature-based temporal walks becomes $\langle w_L \rangle_{L \in N} = \langle \Gamma_{v_1}, \Gamma_{v_2}, \ldots, \Gamma_{v_L} \rangle$.

As used herein, the term "context" of a feature-based temporal walk refers to a subsequence of the feature-based walk constructed by sliding a window of a fixed length over the feature-based temporal walk. For example, for a feature-based temporal walk for feature $h \langle w_{L,f_{(h)}} \rangle_{L \in N} = \langle f_{v_1,h}, f_{v_2,h}, \ldots, f_{v_L,h} \rangle$, $W_T = \{f_{v_{i-\omega},h}, \ldots, f_{v_{i+\omega},h}\}$ is a context of the feature-based temporal walk generated using a sliding window with a parameter $\omega$.

As used herein, the term "network embeddings" is used to refer to underlying characteristics, representations, and encodings of the nodes or edges. Network embeddings can be generated for nodes (also referred to as node embeddings) or edges (also referred to as edge embeddings). For example, the network embeddings for a node can include a class or a group that the node belongs to, such as a user class, a webpage class, and so on. The network embeddings can be a low-dimension embedding vector or a single embedding value.

As used herein, the term "online platform" is used to refer to software program, which when executed, provides an interactive computing environment, such as a website having various interface elements with which user devices interact to achieve various goals. In this disclosure, the term "online platform" may also be used to refer to the interactive computing environment that it provides.

As used herein, the term "activity data" is used to refer to data generated or recorded by an online platform that describes the activities associated with and observed on the online platform. An example of activity data includes data describing a cookie ID visited a webpage, a cookie ID was associated with an IP address, a link to a webpage was added to another webpage, a cookie ID was detected to be at a physical location, and so on.

Referring now to the drawings, FIG. 1 is an example of a computing environment 100 in which a network analysis system 102 can be used to analyze the activities associated with an online platform 114 provided by a host system 112 and, in some cases, facilitate modifications to the online platform 114. In various embodiments, the computing environment 100 includes the network analysis system 102 and the host system 112.

Multiple user devices 118A-118C interact with the online platform 114, such as through user interface(s) 116 over a network 108. The network 108 may be a local-area network ("LAN"), a wide-area network ("WAN"), the Internet, or any other networking topology known in the art that connects the user devices 118 to the host system 112. The interactions can include users visiting and browsing through content hosted by the online platform 114 through the user interfaces 116, users visiting a user interface through another user interface, a user communicating with another user through the user interface 116 or the online platform 114. The interactions between the users or their associated user devices 118 and the online platform 114 are saved as online platform activity data 134, also referred to as activity data 134. The online platform activity data 134 can include a description of an interaction between the user device 118 and the online platform 114 and the time when the interaction occurred. For example, the online platform activity data 134 can include a description indicating that a device with a cookie ID X visited a webpage Y at 9 pm on May 18, 2019, and the same cookie ID X visited webpage Z through webpage Y at 9:05 pm on May 18, 2019.

The online platform activity data 134 can further include other activities associated with the online platform 114. For instance, in the above example, the online platform activity data 134 can further include data describing that the cookie ID X has an IP address P as of 9:00 am on May 18, 2019. Based on this IP address, the online platform activity data 134 can further include data describing that the device having cookie ID X was located in San Jose, CA as of 9:00 pm on May 18, 2019.

The host system 112 records the activities data associated with the online platform 114 and transmits the online platform activity data 134 through a network 120 to the network analysis system 102 for analysis. The network 120 may be the same as, or different from, the network 108 and may also be a LAN, a WAN, the Internet, or any other networking topology known in the art that connects the host system 112 to the network analysis system 102. The network analysis system 102 stores the online platform activity data 134' in a datastore 138. The online platform activity data 134 may be obtained directly from the host systems 112 or through a third party data service.

The network analysis system 102 employs a network analysis module 110 to build a temporal graph 128 based on the online platform activity data 134. The temporal graph 128 includes nodes each representing an object associated with the online platform 114, such as a cookie ID (representing a user) interacting with the online platform 114, an IP address communicating with the online platform 114, a webpage hosted by the online platform 114, a physical location of a device communicating with the online platform 114, and so on. The objects represented by the nodes of the temporal graph 128 can have the same type or different types. Each node also has node features associated therewith. The node features can include structural features, i.e. features derived from graph structure, such as the indegree, outdegree, total degree of a node, triangles, etc. The features can also include features obtained from node attributes, such as device type, IP address, etc. In some scenarios, the nodes in the temporal graph 128 have the same number of features and thus the node features can be represented as a feature vector for each of the nodes.

The temporal graph 128 also includes edges. An edge connects two nodes and represents an association between the objects represented by the two nodes. For example, an edge connecting a node for a cookie ID and a node for a webpage can indicate an association that the cookie ID has visited the webpage. Each of the edges also includes a temporal value indicating the time when the two nodes are associated. For example, the temporal value can be the timestamp of the association of the two nodes. In the above example, the edge connecting the node for a cookie ID and the node for a webpage can be associated with a timestamp of the visit of the webpage by the cookie ID. The temporal value of an edge can also be a number assigned increasingly as new edges are generated. For instance, the first edge of the temporal graph 128 can be assigned a temporal value 1 and the second edge of the temporal graph 128 can be assigned a temporal value 2. The increase from one edge to its subsequent edge can be any positive number and the increases between subsequent edges do not have to be the same. In other words, as long as the temporal value can indicate the temporal orders of the edges being added to the temporal graph 128, any mechanism of assigning temporal values to the edges can be utilized.

The temporal graph 128 dynamically grows to have more and more nodes and edges added, as more and more online platform activity data 134 are received by the network analysis system 102. The temporal graph 128 thus captures the evolution of the activities associated with the online platform 114. Analyzing the temporal graph 128 can thus generate valuable insights regarding the online platform 114 which leads to improvement of the online platform 114. To perform the analysis, the network analysis system 102 utilizes a network analysis module 110 to traverse the nodes in the temporal graph 128 along edges that have increasing temporal values. The traversing generates a temporal walk that obeys time. In other words, the temporal walk traverses from old edges to recent edges according to the temporal values of the edges. Multiple temporal walks can be generated similarly. In this way, the generated temporal walks are able to capture the actual temporally valid sequence of interactions.

The network analysis module 110 further replaces the node IDs in the temporal walks with the features of the respective nodes to generate feature-based temporal walks, a data structure that is different from the data structures used in the prior art. In this way, the analysis is performed based on the features of the nodes rather than the IDs of the nodes. Using the features of the nodes for analysis can capture the structural similarity, such as the roles or positions, of the nodes. Further, the temporal walks generated based on node IDs are not meaningful in another network and the analysis based on such temporal walks cannot be transferred to another network. In contrast, by replacing the node IDs with the node features in the data structure of feature-based temporal walks 130, the analysis on the temporal graph 128 can be generalized across networks and be used for inductive embedding to transfer the learning tasks.

One feature-based temporal walk 130 can be generated for each of the features of the nodes. As a result, multiple feature-based temporal walks 130 can be generated for one temporal walk. Alternatively, or additionally, a feature-based temporal walk 130 can be generated using feature vectors of the nodes in the temporal walk, leading to one feature-based temporal walk 130 generated for each temporal walk. Based on the feature-based temporal walks 130, the network analysis module 110 applies network embedding extraction methods to generate network embeddings 132 for the network nodes.

The generated network embeddings 132 capture the characteristics of the nodes in the temporal graph 128. The network embeddings for a node can have the same dimension as the features of the node or a different dimension. For example, the embeddings for a node can be generated by determining an embedding function that maps each of the node features to an embedding value. The embeddings can also be generated by mapping the feature vector of a node to a low-dimension embedding vector or a single embedding value. In some implementations, the network embeddings 132 might also be generated for edges of the temporal graph 128 to capture characteristics or features of the edges. For example, the embeddings for an edge can be generated by combining the embeddings of the nodes connected by the edge. Other ways of generating embeddings for an edge can also be utilized. Additional details regarding generating the feature-based temporal walks 130 and the network embeddings 132 are provided below with regard to FIG. 2-6.

While the above description focuses on the network analysis system building the temporal graph 128 based on the online platform activity data 134, in other examples, the network analysis system 102 receives network data that is in the form of the temporal graph 128 from the host system 112 or another system. As the network evolves, more network data is received at the network analysis system 102 to reflect the changes in the network and to update the temporal graph 128.

The network analysis module 102 may transmit the network embeddings 132 to the host system 112. In some embodiments, doing so causes the host system 112 to modify the online platform 114 to improve its performance. The host system 112 can apply a model, such as a machine learning model, on the network embeddings 132 to perform further analysis, such as identity resolution, or more specifically user stitching, to identify the nodes that correspond to the same user. Based on the results of the user stitching, the online platform 114 can, for example, modify the user interfaces 116 in different ways for different users to match the preferences of the users. For instance, the online platform 114 can generate new layouts or rearrange the layout of the user interfaces 116 differently for different users, such as changing the color, the font size of the user interfaces 116. The online platform 114 can also present different content in the user interfaces 116 for different users to keep users engaged with the online platform 114. Other ways of changing the user interfaces 116 can also be performed. In addition to identity resolution or user stitching, the host system 112 may also utilize the network embeddings 132 for other applications such as generating user behavior profiles, predicting user preferences, or a combination thereof.

In some implementations, the analysis based on the network embeddings 132 can be performed by the network analysis module 110 by, for example, applying a machine learning model trained for applications such as identity resolution, user behavior profile generation, user preference prediction, personalization or recommendation, etc. The network analysis module 110 can communicate the results of the analysis to the host system 112 or other computing devices associated with the host system 112 to cause the online platform 114 to be modified accordingly.

In addition, the host system 112 can also modify other aspects of the online platform 114. For example, the host system 112 can modify the content that is communicated to a user device 118, such as an email sent to the user device 118, based on the analysis of the network embeddings 132 regarding the identity of the user associated with the user device, the behavior profile of the user, the predicted preferences of the user, and so on. The host system 112 may also change the way the online platform 114 communicates or interacts with the user devices 118 based on the analysis results, such as changing from presenting a webpage content to sending an email or vice versa.

One or more computing devices are used to implement the network analysis system 102 and the host system 112. For instance, the network analysis system 102, the host system 112, or both could include a single computing device, a group of servers or other computing devices arranged in a distributed computing architecture, etc.

The online platform 114 can be any suitable online service for interactions with the user devices 118. Examples of an online platform include a content creation service, a query system, etc. In some embodiments, one or more host systems 112 are included in the computing environment 100 and they are third-party systems that operate independently of the network analysis system 102 (e.g., being operated by different entities, accessible via different network domains, etc.). In additional or alternative embodiments, one or more host systems 112 include a network analysis system 102 as part of a common computing system.

The user device 118 may be any device which is capable of accessing an online service. For non-limiting examples, user device 118 may be a smartphone, smart wearable, laptop computer, desktop computer, or other types of the user device.

Figure 2:
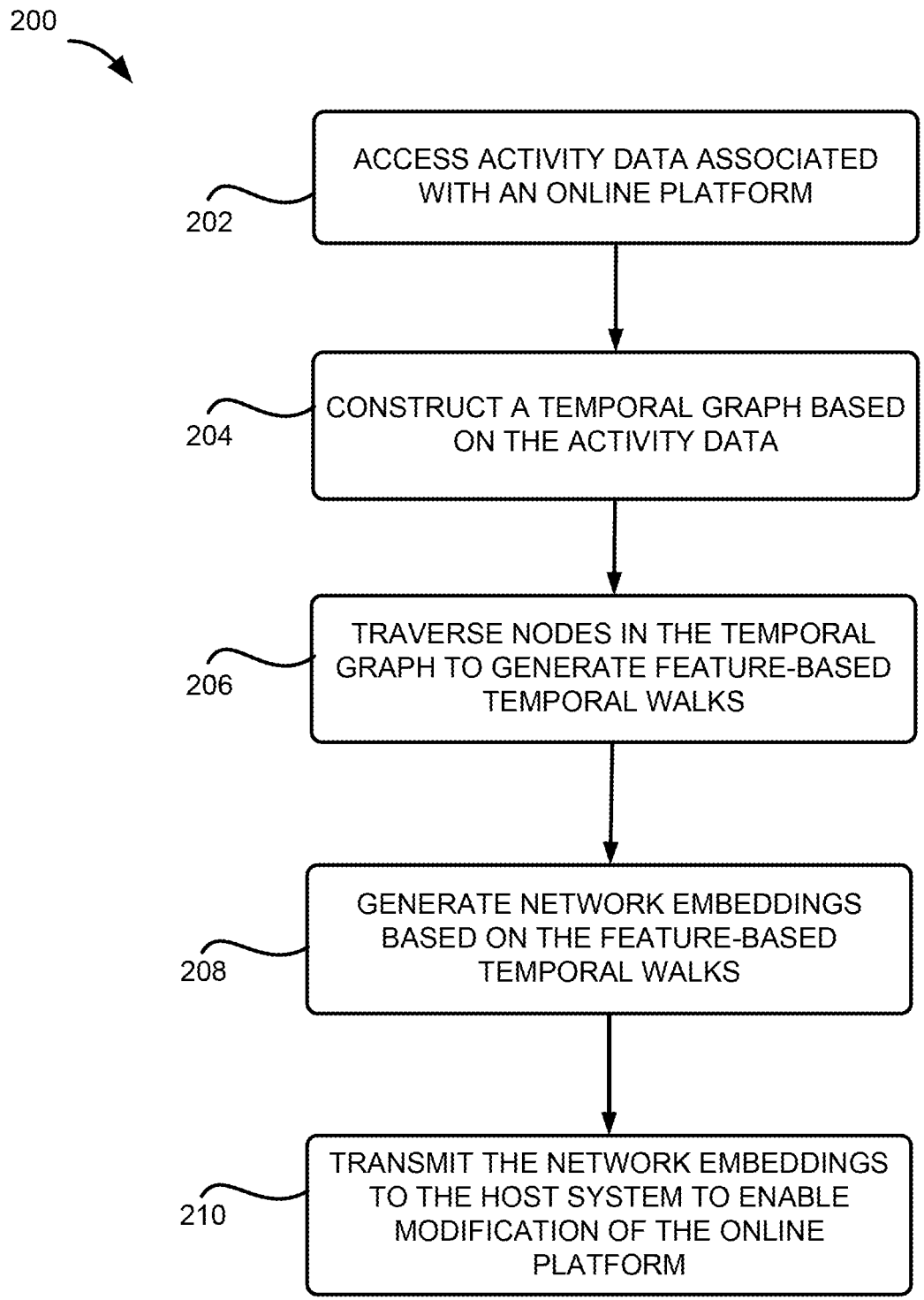
FIG. 2 depicts an example of a process for facilitating the modification of an online platform based on analysis of the activities associated with the online platform, according to certain aspects of the present disclosure.

FIG. 2 depicts an example of a process 200 for facilitating the modification of an online platform 114 based on network embeddings 132 obtained from a temporal graph 128 built from activity data associated with the online platform 114, according to certain aspects of the present disclosure. One or more computing devices (e.g., the network analysis system 102) implement operations depicted in FIG. 2 by executing suitable program code. For illustrative purposes, the process 200 is described with reference to certain examples depicted in the figures. Other implementations, however, are possible.

At block 202, the process 200 involves accessing online platform activity data 134. For instance, interactions between user devices 118 and the online platform 114, as well as other data associated with the user devices 118 and the online platform 114, are recorded and used to generate the online platform activity data 134. The host system 112 or another computing system configured for generating the online platform activity data 134 sends the online platform activity data 134 to the network analysis system 102 for analysis. The network analysis system 102 stores the online platform activity data 134' in a suitable non-transitory computer-readable medium or other memory device, such as the datastore 138 associated with the network analysis system 102. In some embodiments, the online platform activity data 134' is stored on one or more non-transitory computer-readable media within the host system 112 or on a third-party system. The network analysis system 102 accesses the online platform activity data 134 via suitable communications with the host system 112 or the third-party system.

The online platform activity data 134 includes records of activities associated with the online platform 114, such as the interactions between the user devices 118 and the online platform 114, the time when the interaction occurred, the attributes of the user devices 118 and the online platform 114 when the interaction occurred, and so on. FIG. 3 depicts an example of online platform activity data 134 associated with the online platform 114, according to certain aspects of the present disclosure. In this example, the online platform activity data 134 includes multiple records, and each record describes the activity and its associated time information. The time information can be represented using timestamp when the activity occurred. In the example shown in FIG. 3, the time information is represented using a temporal value incrementally generated as new activities are being recorded.

In the example shown in FIG. 3, at time point 5, web cookie #1 has an IP address #7. At time point 7, web cookie #2 visited webpage #5 hosted on the online platform 114. At time point 16, a new link is added to webpage #5 that points to webpage #11. At time point 17, web cookie #2 visited webpage #11. As new activities are observed at the online platform 114, the host system 112 generates and sends new online platform activity data 134 to the network analysis system 102. As such, the online platform activity data 134 stored in the datastore 138 evolves over time.

Referring back to FIG. 2, at block 204, the process 200 involves obtaining or constructing a temporal graph 128 based on the online platform activity data 134. The network analysis system 102 analyzes the online platform activity data 134 to determine the objects that can be mapped to nodes of the temporal graph 128, such as cookie IDs, IP addresses, physical locations, webpages, email addresses, and so on. These objects can be of different types and thus the generated temporal graph 128 represents a heterogeneous network G. Edges between the nodes are also added based on the interactions between the objects represented by the nodes. The time when the interactions occurred are also associated with the edges. As a result, the temporal information in the online platform activity data 134 is also captured by the temporal graph 128. In one example, the temporal graph G can be defined as G=(V, $E_\tau$, $\tau$) that includes a nodeset V and edgeset $E_\tau$. A node $v_i$ in the nodeset V has a feature vector $\Gamma_{v_i} = [f_{v_i,1}, f_{v_i,2}, \ldots, f_{v_i,d}]$ associated therewith, wherein $f_{v_i,j}$ is the j-th feature of node $v_i$ and d is the dimension of the feature vector. An edge $e_i$ in the edgeset $E_\tau$ connecting two nodes in the nodeset V and has a temporal value $\tau(e_i)$ associated therewith to indicate the time point when the edge $e_i$ is added to the temporal graph G.

FIG. 4 depicts an example of a portion of a temporal graph 400 generated based on the examples of activity data shown in FIG. 3, according to certain aspects of the present disclosure. The nodes of the temporal graph 400 are identified as A, B, ... L, P, and Q. In this example, nodes Q represents IP address #7; node H represents web cookie #1; node I represents webpage #5; node J represents web cookie #2; and node K represents webpage #11. The edges are each associated with a number representing the temporal value of the respective edge. For example, the edge from node I to node K is associated with a temporal value 16 to indicate the time when the node I is associated with node K.

Referring back to FIG. 2, at block 206, the process 200 involves traversing the nodes along the edges in the temporal graph 128 to generate feature-based temporal walks 130, i.e. sequences of feature values. The traversing is performed by following a sequence of edges having non-decreasing temporal values. The sequence of the nodes visited during the traversing form a temporal walk. In one example, the temporal walk can be defined as: A temporal walk W of length L from $v_1$ to $v_L$ in graph $G=(V, E_\tau, \tau)$ is a sequence of vertices $(v_1, v_2, \ldots, v_L)$ such that $(v_i, v_{i+1}) \in E_\tau$, for $1 \leq i \leq L$, and the temporal values are in valid temporal order: $\tau(v_i, v_{i+1}) \leq \tau(v_{i+1}, v_{i+2})$ for $1 \leq i \leq L$.

FIG. 5 depicts an example of temporal walks 502 generated from the temporal graph shown in FIG. 4. In this example, 6 temporal walks 502 are generated and for each walk, the temporal values of the edges are also labeled. For example, the first temporal walk 502 includes node H, node I (reached from node H through an edge having a temporal value 13), and node K (reached from node I through an edge having a temporal value 16). This is a valid temporal walk because the sequence of edges involved in the walk is ordered from old edges (having smaller temporal values) to new edges (having more recent or larger temporal values). FIG. 5 also shows other valid temporal walks 502.

To generate a valid temporal walk 502, the network analysis system 102 selects an initial edge as the start of the temporal walk. In one example, the network analysis system 102 selects the initial edge among all the edges of the temporal graph 128 randomly with an equal probability. As such, this type of selection is an unbiased selection. Alternatively, or additional, the selection of the initial edge can be biased in that more recent edges are selected with a higher probability, such as by following an exponential function or a linear function. The maximum length $L_{max}$ of the temporal walk 502 can be specified as a parameter for the traversing process. From the initial edge, at most $L_{max}$ nodes can be traversed and included in a temporal walk 502. Due to the temporal constraint, i.e. the temporal walk has to obey time, and the structure of the temporal graph 128, a temporal walk 502 may include fewer than $L_{max}$ nodes. In some embodiments, a lower bound can be specified for the length of the temporal walk 502 so that temporal walks that have fewer nodes than the lower bound are discarded.

As discussed above, the temporal walk 502 can be generated by starting from the initial edge and traversing the nodes in the temporal graph 128 along the time increasing direction. Alternatively, the network analysis system 102 can also generate a temporal walk 502 by starting from the initial edge and traversing the nodes in reverse time direction, i.e. following edges with non-increasing temporal values. In this case, the temporal walk 502 can be generated by reversing the order of the nodes visited during the traversing.

The network analysis system 102 further converts the generated temporal walks 502 to feature-based temporal walks 130 by replacing the node IDs with the features of the respective nodes. As discussed above, multiple feature-based temporal walks 130 can be generated for one temporal walk 502 if one feature is used in a feature-based temporal walk 130. As a result, if the node each have d features, d feature-based temporal walks 130 are generated for a temporal walk 502. In one example, a feature-based temporal walk can be defined as: a feature-based temporal walk of length L from $v_1$ to $v_L$ in graph $G=(V, E_\tau, \tau)$ is a sequence of feature values corresponding to the sequence of nodes in a valid temporal walk W. For the jth feature $f_{(j)}$, the corresponding feature-based temporal walk is $$\langle w_{L,f_{(j)}} \rangle_{L \in \mathbb{N}} = \langle f_{v_1,j}, f_{v_2,j}, \ldots, f_{v_L,j} \rangle, \tag{1}$$

where $f_{v_i,j}$ is the value of the j-th feature for node vi from the feature vector $\Gamma_{v_i}$.

Alternatively, or additionally, a feature-based temporal walk 130 can be generated for a temporal walk 502 by replacing the node IDs with the d-dimensional feature vector $\Gamma$ for each node. In this case, the feature-based temporal walks 130 becomes $$\langle w_L \rangle_{L \in \mathbb{N}} = \langle \Gamma_{v_1}, \Gamma_{v_2}, \ldots, \Gamma_{v_L} \rangle \tag{2}$$

FIG. 5 shows examples of the feature-based temporal walks 130 based on the feature vector for each node. In this example, $\Gamma_X$ represents the feature vector of node X. A feature-based temporal walk 130 thus includes a sequence of feature vectors, such as $\{\Gamma_H \Gamma_I \Gamma_K\}$ in the first feature-based temporal walk, and $\{\Gamma_B \Gamma_D \Gamma_C \Gamma_D\}$ in the fifth feature-based temporal walk 130.

Referring back to FIG. 2, at block 208, the process 200 involves generating network embeddings based on the feature-based temporal walks 130. Network embeddings 132 can be generated for nodes (also referred to as node embeddings) or edges (also referred to as edge embeddings). Network embeddings describe the underlying characteristics of the nodes or edges so that the network embeddings can be used for further analysis of the online platform 114. Network embeddings 132 can be generated in various ways.

In one example, the network embeddings 132 are generated by deriving a network embedding function. For instance, to generate a node embedding, denote the feature value for the h-th feature of node $v_i$ as $f_{v_i,h}$. Based on a feature-based temporal walk, the node embeddings can be derived as $$\max_{\varphi} \log Pr(W_T = \{f_{v_{i-\omega},h}, \ldots, f_{v_{i+\omega},h}\} \setminus f_{v_i,h} \mid \varphi(f_{v_i,h})) \tag{3}$$

where $\varphi$ is the node embedding function, $\omega$ is the context window size for optimization, and $S=\{v_{i-\omega}, \ldots, v_{i+\omega}\}$ is an arbitrary temporal context window such that $$\mathcal{T}_{(v_{i-\omega}, v_{i-\omega+1})} < \ldots < \mathcal{T}_{(v_{i+107-1}, v_{i+\omega})} \tag{4}$$

Thus, $$W_T = \{f_{v_{i-\omega},h}, \ldots, f_{v_{i+\omega},h}\} \tag{5}$$

is the temporal feature-based context window from S using feature h. In other words, each node u in the temporal context window S is replaced with its feature value $f_{u,h}$ for feature h. The temporal feature-based context window $W_T$ can be generated for all features in the feature vector F of the nodes.

Assuming conditional independence, $$Pr(W_T \mid \varphi(f_{v_i,h})) = \prod_{v_{i=k} \in S} Pr(f_{v_{i+k},h} \mid \varphi(f_{v_i,h})). \quad (6)$$

The conditional likelihood can be modeled as a softmax unit parameterized by a dot product of their embedding vectors:

$$Pr(f_{v_{i+k},h} \mid \varphi(f_{v_i,h})) = \frac{\exp[\varphi(f_{v_i,h}) \cdot \varphi(f_{v_i,h})]}{\Sigma_{v_k \in V} \exp[\varphi(f_{v_k,h}) \cdot \varphi(f_{v_i,h})]}. \quad (7)$$

The optimization problem in Eqn. (3) reduces to:

$$\max_{\varphi} \sum_{v_i \in V} \left( -\log Z_i + \sum_{v_j \in S} \varphi(f_{v_k,h}) \cdot \varphi(f_{v_i,h}) \right), \quad (8)$$

where the term $Z_i = \Sigma_{v_j \in V} \exp[\varphi(f_{v_j,h}) \cdot \varphi(f_{v_i,h})]$ can be approximated by negative sampling. The above process can be repeated for each feature of the nodes. The solution to the optimization problems, i.e. the embedding functions $\varphi(f_{v_i,h})$, can be utilized to apply to the features of each node to generate the network embeddings 132 for the nodes.

In another example, the network analysis system 102 can generate the network embeddings 132 based on the feature vector $\Gamma_i$ of node i, rather than individual feature values. For instance, denote the d-dimensional feature vector of node i as $\Gamma_i$, i=1, ..., |V|. Let $\gamma: \Gamma_i \rightarrow \{1, ..., K\}$ such that K≤|V|. Hence, the function $\gamma(\Gamma_i)$ maps a d-dimensional feature vector $\Gamma_i$ of a node i to a single embedding value. In general, $\gamma$ can be a function based on some form of clustering, low-rank approximation, or a function such as concatenation. For example, if $\gamma$ is a clustering function (e.g. k-means clustering function), then $\gamma(\Gamma_i)$ can be used to generate the cluster (e.g. group, type, role) of node i. In some implementations, K is close to |V|, and in other cases, K is much smaller than |V|. The value of K depends on the data and the application, and can be set by a user or learned automatically using a hyperparameter optimization routine.

By generating the network embeddings 132 based on the feature vector $\Gamma_i$ instead of the individual feature values, the embedding process described above does not need to be repeated for each feature value. However, this may lead to lower predictive performance because all the information contained in the feature vector is compressed into a signal embedding value, which may compress useful information in the feature vector. On the other hand, if the feature values are noisy, the compression effect of the network embedding generation can reduce or remove the noise in the features of the nodes, thereby improving the predictive performance.

In another example, network embeddings are generated from the feature-based temporal walks by first constructing contexts, such as $S=\{v_{i-\omega}, ..., v_{i+107}\}$ using a sliding window with a parameter $\omega$ over every feature-based temporal walk. Thus, given a feature-based temporal walk, the network analysis system 102 generates multiple contexts using a sliding window over the walk. The network analysis system 102 repeats this for all feature-based temporal walks and generates a set of temporally valid feature contexts for the nodes. The network analysis system 102 further constructs a node-by-context matrix. Define $Y_{ij}$ as the number of times the temporally valid feature context j is used in a temporal walk involving node i. The network analysis system 102 further derives the network embeddings 132 using the node-by-context matrix Y to derive low-rank multi-dimensional embeddings using a low-rank matrix factorization method, e.g., singular value decomposition (SVD), non-negative matrix factorization (NMF). Various other ways to define the matrix Y using the temporal feature-based walks can be utilized and any arbitrary low-rank matrix factorization method can be applied to such matrix Y to obtain the network embeddings 132. Alternatively, or additionally, network embeddings 132 can be generated using hashing over the contexts generated from the feature-based temporal walks.

Moreover, any embedding method that uses random walks with node IDs can be used and adapted for use with the feature-based temporal walks, such as methods based on the Skip-gram architecture or any other framework or class of methods that use random walks based on node IDs.

Referring back to FIG. 2, at block 210, the process 200 involves identifying two or more nodes that belong to the same entity based on the network embeddings. For example, a machine learning model can be employed to classify the nodes based on their network embeddings into different classes. The nodes falling in the same class can be identified as belonging to the same entity. Based on the results, the network analysis system 102 or the host system 112 or another computing device can build a profile for each entity. Such an entity profile could be used to, for example, generate recommended or personalized content for delivery to a computing device associated with the entity.

In another example, the network analysis system can also transmit the network embeddings 132 to the host system 112 so that modification can be made to the online platform 114. In some embodiments, the network embeddings 132 may be transmitted to a management system configured to manage and configure the online platform 114. Based on the network embeddings 132, the host system 112 or other systems performs further analysis, such as applying a machine learning model, for various applications such as identity resolution, user behavior profile generation, user preference prediction, personalization or recommendation, etc. Based on the analysis result, the host system 112 or other systems associated with the online platform 114 can, for example, modify and improve the online platform 114, such as changing the user interfaces to include content or layout personalized to each user to reduce the time that a user spends on finding relevant information, or to generate and push relevant content to users proactively. Other types of improvements can also be made depending on the network embeddings 132 generated from the temporal graph 128. The online platform 114 may also be modified in any suitable manner including, but not limited to, the examples discussed above with respect to FIG. 1.

By using data structures, such as the temporal graph 128, the feature-based temporal walks 130, and the network embeddings 132, the embodiments presented herein improve the processing of large datasets of online activity data which can be used for customizing, improving or otherwise modifying online platforms.

Figure 6:
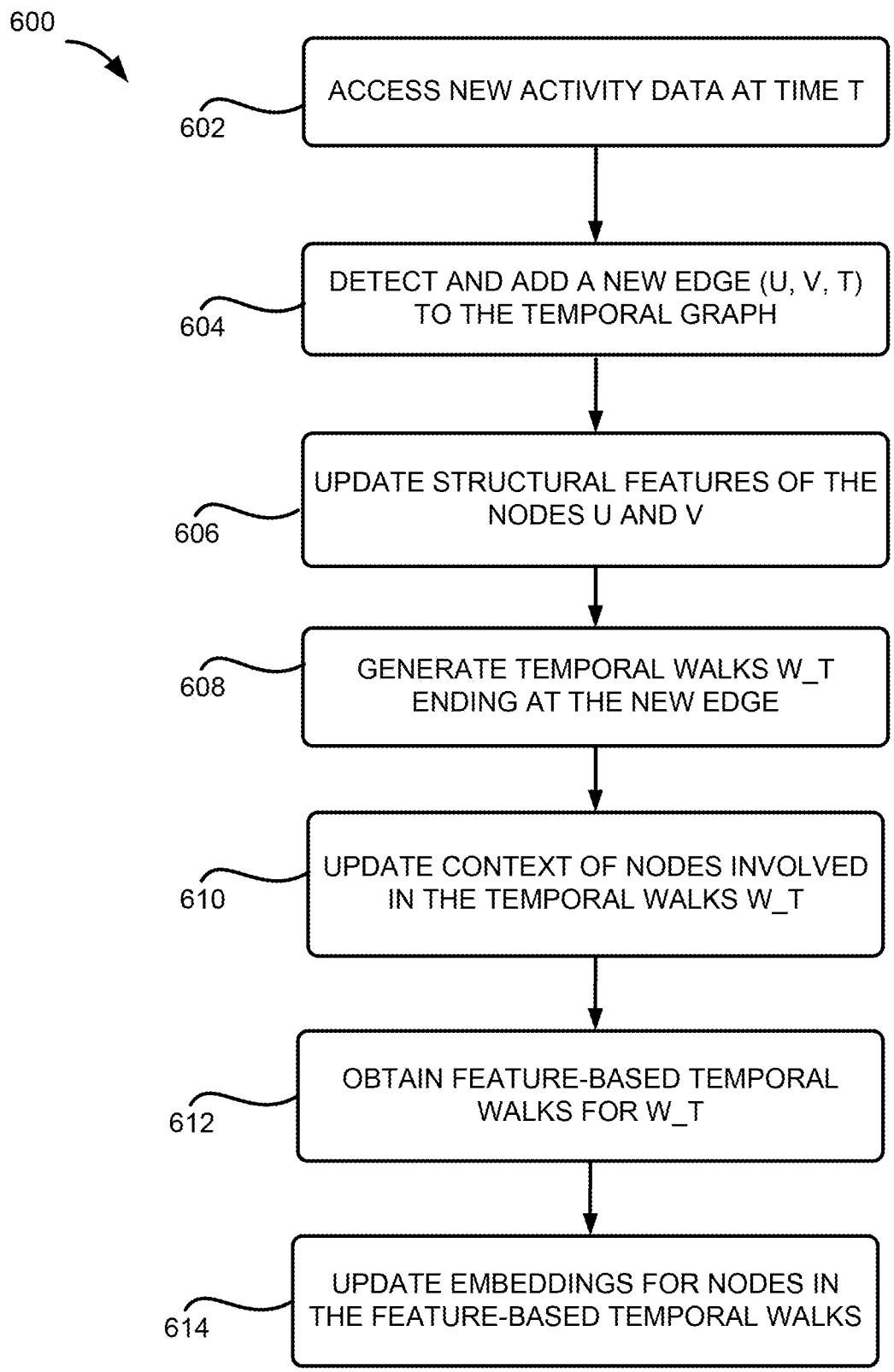
FIG. 6 depicts an example of a process for updating network embeddings generated for an online platform based on new activity data associated with the online platform, according to certain aspects of the present disclosure.

FIG. 6 depicts an example of a process for updating network embeddings 132 generated for an online platform 114 based on new activity data associated with the online platform 114, according to certain aspects of the present disclosure. One or more computing devices (e.g., the network analysis system 102) implement operations depicted in FIG. 6 by executing suitable program code (e.g., the network analysis module 110). For illustrative purposes, process 600 is described with reference to certain examples depicted in the figures. Other implementations, however, are possible.

At block 602, the process 600 involves accessing new activity data 134 at time t. Similar to block 202, the network analysis system 102 can access the new activity data 134 by receiving the new activity data 134 from the online platform 114 and storing it in the datastore 138. Alternatively, the network analysis system 102 can access the new activity data 134 by requesting the data from the online platform 114 or by receiving or requesting the new activity data 134 from a third-party device. The new activity data describes the activities associated with the online platform 114 that occurred around time t.

At block 604, the process 600 involves analyzing the new activity data 134 to detect new edges to be added to the temporal graph 128. If the network analysis system 102 detects a new association between two nodes of the temporal graph 128, the network analysis system 102 added a new edge $e_t=(u, v, t)$, i.e. an edge from node u to node v, to the temporal graph 128. Here, u and v are the two nodes connected to the new edge $e_t$ and t is the temporal value associated with new edge indicating that the association between u and v occurred at time t. The nodes u and v may include existing nodes of the temporal graph 128 or new nodes to be added to the temporal graph 128 due to the new activity. In the latter case, the new nodes are also added to the temporal graph 128.

At block 606, the process 600 involves updating the structural feature of the nodes u and v and their temporal neighbors. Due to the addition of the new edge (u, v, t), and sometimes new nodes, the structural features, such as the indegree or outdegree of the nodes u and v in the temporal graph 128 are changed and should be updated. Temporal neighbors of nodes u and v might also be impacted by the change and thus the network analysis system 102 also updates the structural features of those nodes.

At block 608, the process 600 involves generating temporal walks $W_t$ ending at the newly added edge $e_t$. The temporal walks $W_t$ are generated by randomly sampling several temporal walks ending in $e_t$ in reverse time direction from all the possible temporal walks ending in $e_t$. To sample a temporal walk, the network analysis system 102 starts from the newly added edge $e_t$ and determines a next edge that has a temporal value smaller than the temporal value of the edge $e_t$. In some examples, the next edge is determined by following a uniform distribution over all the possible neighbor edges, i.e. all neighbor edges having a temporal value smaller than t are selected with an equal probability. Alternatively, or additionally, neighbor edges with a recent temporal value (i.e. a higher temporal value) are selected with a higher probably, for example, by following an exponential distribution or a linear distribution. In this way, the network analysis system 102 generates each updated feature-based temporal walk by reversely traversing a set of nodes in the temporal graph 128 along the edges with non-increasing temporal values.

At block 610, the process 600 involves updating the context for those nodes involved in the sampled multiple temporal walks. As discussed above, in some embedding generation mechanisms, contexts of the feature-based temporal walks are used in determining the network embeddings 132. The addition of the new edge $e_t$ may also impact those contexts used for generating the network embeddings 132 for the nodes and edges. Thus, the network analysis system 102 updates the context for the nodes that are observed in the sampled temporal walks.

At block 612, the process 600 involves obtaining feature-based temporal walks for the sample temporal walks generated at block 608. The feature-based temporal walks can be obtained by replacing the node IDs in the temporal walks with the feature values or feature vectors of the respective nodes. In another example, block 612 can be combined with block 608 to generate the feature-based temporal walks 130 directly by using the features of the nodes during the reverse traversing. At block 614, the process 600 involves updating embeddings for nodes that are involved in the feature-based temporal walks obtained at block 612. The embeddings are updated using the same or different embedding generation methods that were used to generate previous embeddings.

Through the process 600, only those nodes that were impacted by the addition of the new edge at time t are updated by generating updated embeddings. Other nodes that were not impacted by the new edge are not updated thereby eliminating unnecessary computational resource consumption.

Example of a Computing System for Implementing Certain Embodiments

Figure 7:
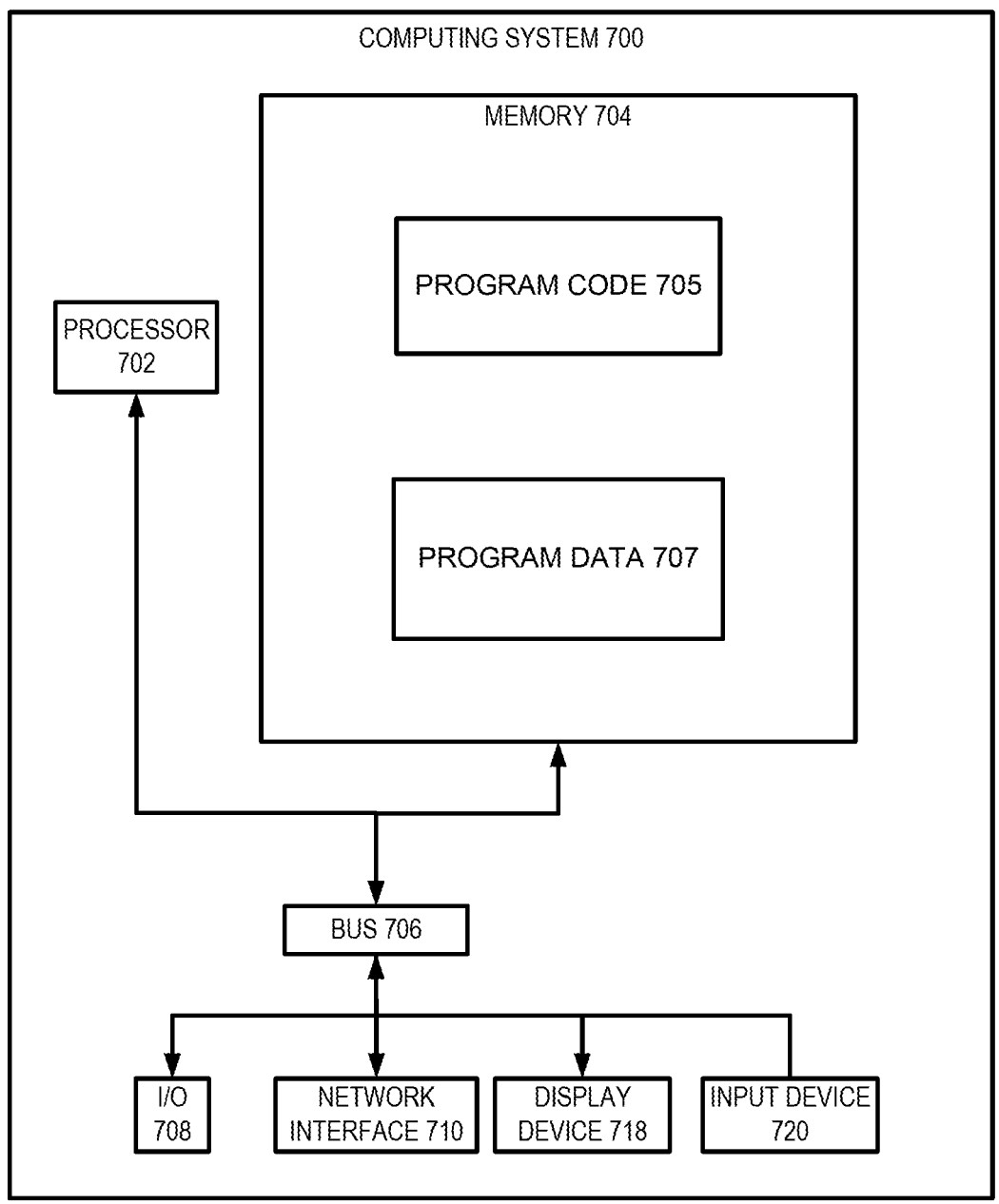
FIG. 7 depicts an example of a computing system for implementing certain aspects of the present disclosure.

Any suitable computing system or group of computing systems can be used for performing the operations described herein. For example, FIG. 7 depicts an example of the computing system 700. The implementation of computing system 700 could be used for one or more of a network analysis system 102 and a host system 112. In other embodiments, a single computing system 700 having devices similar to those depicted in FIG. 7 (e.g., a processor, a memory, etc.) combines the one or more operations and data stores depicted as separate systems in FIG. 1.

The depicted example of a computing system 700 includes a processor 702 communicatively coupled to one or more memory devices 704. The processor 702 executes computer-executable program code stored in a memory device 704, accesses information stored in the memory device 704, or both. Examples of the processor 702 include a microprocessor, an application-specific integrated circuit ("ASIC"), a field-programmable gate array ("FPGA"), or any other suitable processing device. The processor 702 can include any number of processing devices, including a single processing device.

A memory device 704 includes any suitable non-transitory computer-readable medium for storing program code 705, program data 707, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 700 executes program code 705 that configures the processor 702 to perform one or more of the operations described herein. Examples of the program code 705 include, in various embodiments, the network analysis module 110 by the network analysis system 102, the online platform 114, or other suitable applications that perform one or more operations described herein (e.g., one or more development applications for configuring the online platform 114). The program code may be resident in the memory device 704 or any suitable computer-readable medium and may be executed by the processor 702 or any other suitable processor.

In some embodiments, one or more memory devices 704 stores program data 707 that includes one or more datasets and models described herein. Examples of these datasets include interaction data, performance data, etc. In some embodiments, one or more of data sets, models, and functions are stored in the same memory device (e.g., one of the memory devices 704). In additional or alternative embodiments, one or more of the programs, data sets, models, and functions described herein are stored in different memory devices 704 accessible via a data network. One or more buses 706 are also included in the computing system 700. The buses 706 communicatively couples one or more components of a respective one of the computing system 700.

In some embodiments, the computing system 700 also includes a network interface device 710. The network interface device 710 includes any device or group of devices suitable for establishing a wired or wireless data connection to one or more data networks. Non-limiting examples of the network interface device 710 include an Ethernet network adapter, a modem, and/or the like. The computing system 700 is able to communicate with one or more other computing devices via a data network using the network interface device 710.

The computing system 700 may also include a number of external or internal devices, an input device 720, a presentation device 718, or other input or output devices. For example, the computing system 700 is shown with one or more input/output ("I/O") interfaces 708. An I/O interface 708 can receive input from input devices or provide output to output devices. An input device 720 can include any device or group of devices suitable for receiving visual, auditory, or other suitable input that controls or affects the operations of the processor 702. Non-limiting examples of the input device 720 include a touchscreen, a mouse, a keyboard, a microphone, a separate mobile computing device, etc. A presentation device 718 can include any device or group of devices suitable for providing visual, auditory, or other suitable sensory output. Non-limiting examples of the presentation device 718 include a touchscreen, a monitor, a speaker, a separate mobile computing device, etc.

Although FIG. 7 depicts the input device 720 and the presentation device 718 as being local to the computing device that executes the network analysis system 102, other implementations are possible. For instance, in some embodiments, one or more of the input device 720 and the presentation device 718 can include a remote client-computing device that communicates with the computing system 700 via the network interface device 710 using one or more data networks described herein.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alternatives to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method in which one or more processing devices associated with a network analysis system perform operations comprising:
   receiving, by a processor executing program code instructions, network data in the form of a temporal graph that includes nodes having respective identifiers and edges, wherein each edge (a) has a direction pointing from a first node to a second node, (b) connects the first node to the second node to indicate an association of the first node with the second node, and (c) has a temporal value indicating a time point when the association of the first node with the second node was created, and wherein each node is associated with a set of feature values;
   generating, by a processor executing program code instructions, a sequence of nodes by traversing a subset of nodes in the temporal graph along a subset of the edges having non-decreasing temporal values;

forming, by a processor executing program code instructions, a sequence of feature values by replacing the identifiers of nodes in the sequence of nodes with respective sets of feature values of the respective nodes, wherein the set of feature values of a node comprise one or more of:
an indegree of the node indicating a number of edges pointing to the node;
an outdegree of the node indicating a number of edges pointing from the node; or
a total degree as a sum of the indegree and the outdegree;
determining, by a processor executing program code instructions and based on the sequence of feature values, a network embedding for each node of the subset of nodes traversed in the temporal graph, the network embedding for each node of the subset of nodes being representative of characteristics that describe the node; and
identifying, by a processor executing program code instructions, two or more of the nodes that belong to a same entity based on the network embeddings of the subset of nodes.

2. The method of claim 1, further comprising determining one of the edges as an initial edge to start traversing the subset of nodes in the temporal graph.

3. The method of claim 2, wherein determining one of the edges as an initial edge is performed by selecting the initial edge based on a uniform distribution of the edges or by selecting an edge having a more recent temporal value with a higher probability than other edges.

4. The method of claim 1, further comprising:
receiving additional network data describing a new edge added to the temporal graph;
updating features of nodes connected to the new edge;
generating a second sequence of nodes by reversely traversing, starting from the new edge, a second subset of nodes in the temporal graph along edges with non-increasing temporal values;
forming a second sequence of feature values by replacing the identifiers of nodes in the second sequence of nodes with the respective sets of feature values of the respective nodes; and
updating embeddings of the nodes in the second sequence of nodes based on the second sequence of feature values.

5. The method of claim 4, further comprising:
generating a third sequence of nodes by reversely traversing, starting from the new edge, a third subset of nodes in the temporal graph along edges with non-increasing temporal values,
forming a third sequence of feature values by replacing the identifiers of nodes in the third sequence of nodes with the respective sets of feature values of the respective nodes; and
updating embeddings of the nodes in the third sequence of nodes based on the feature values of the third sequence of feature values.

6. The method of claim 1, further comprising transmitting the network embeddings for the subset of nodes to a computing device associated with an online platform, wherein the network embeddings for the subset of nodes are usable for modifying the online platform.

7. The method of claim 1, wherein the network embeddings of the subset of nodes are generated based on a SkipGram model.

8. A system comprising:
a memory device maintaining network data in the form of a temporal graph that includes nodes having respective identifiers and edges, wherein each edge (a) has a direction pointing from a first node to a second node, (b) connects the first node to the second node to indicate an association of the first node with the second node, and (c) has a temporal value indicating a time point when the first node and the second node were associated, and wherein each node is associated with a set of feature values; and
a processor system configured for performing operations comprising:
traversing one or more of the nodes in the temporal graph along edges with non-decreasing temporal values,
forming a sequence of feature values by replacing the identifiers of the traversed one or more nodes with respective sets of feature values of the respective nodes, wherein the set of feature values of a node comprise one or more of:
an indegree of the node indicating a number of edges pointing to the node;
an outdegree of the node indicating a number of edges pointing from the node; or
a total degree as a sum of the indegree and the outdegree,
determining, based on the sequence of feature values, a network embedding for the one or more nodes traversed in the temporal graph, the network embedding for the one or more nodes being representative of characteristics that describe the one or more nodes, and
determining, from the network embedding, that two or more of the nodes in the temporal graph belong to a same entity.

9. The system of claim 8, wherein the feature values of the one or more nodes comprise feature values associated with a structure of the temporal graph.

10. The system of claim 8, wherein the nodes in the temporal graph represent entities involved in network activities and each of the edges representing an action performed by the entities represented by the nodes connected to the edge.

11. The system of claim 10, wherein a node of the temporal graph corresponds to one of a webpage hosted by an online platform, a cookie ID assigned to a computing device visiting a webpage hosted by the online platform, an IP address associated with a computing device visiting the online platform, or a location associated with a computing device communicating with the online platform.

12. The system of claim 8, wherein the operations further comprise determining one of the edges as an initial edge to start traversing the one or more nodes in the temporal graph.

13. The system of claim 12, wherein determining one of the edges as an initial edge is performed by selecting the initial edge based on a uniform distribution of the edges or by selecting an edge having a more recent temporal value with a higher probability than other edges.

14. The system of claim 8, wherein the operations further comprise transmitting the network embeddings for the one or more nodes to a computing device associated with an online platform, wherein the network embeddings for the one or more nodes are usable for modifying the online platform.

15. A non-transitory computer-readable medium having program code that is stored thereon, the program code executable by one or more processing devices for performing operations comprising:

generating a temporal graph based on activity data describing network activities associated with an online platform, the temporal graph comprising nodes having respective identifiers and edges, wherein each edge (a) has a direction pointing from a first node to a second node, (b) connects the first node to the second node to indicate an association of the first node with the second node, and (c) has a temporal value indicating a time point when the first node was associated with the second node, and wherein each node is associated with a set of feature values;

traversing one or more of the nodes in the temporal graph along edges with non-decreasing or non-increasing temporal values to generate a sequence of nodes;

replacing the identifiers of the one or more nodes in the sequence of nodes with respective sets of feature values of the respective nodes to form a sequence of feature values, wherein the set of feature values of a node comprise one or more of:

an indegree of the node indicating a number of edges pointing to the node;

an outdegree of the node indicating a number of edges pointing from the node; or a total degree as a sum of the indegree and the outdegree; and determining a network embedding for each of the one or more nodes traversed in the temporal graph based on the sequence of feature values, the network embedding for each of the respective one or more nodes being representative of characteristics that describe the respective node.

16. The non-transitory computer-readable medium of claim 15, wherein the operations further comprise determining one of the edges as an initial edge to start traversing the one or more nodes in the temporal graph.

17. The non-transitory computer-readable medium of claim 16, wherein determining one of the edges as an initial edge is performed by selecting the initial edge based on a uniform distribution of the edges or by selecting an edge having a more recent temporal value with a higher probability than other edges.

18. The non-transitory computer-readable medium of claim 15, wherein determining two or more of the nodes belong to a same entity based on the network embeddings of the one or more nodes.

19. The non-transitory computer-readable medium of claim 15, wherein the feature values of the one or more nodes comprise feature values associated with a structure of the temporal graph.

\* \* \* \* \*